US009733353B1

(12) United States Patent
Carlson et al.

(10) Patent No.: US 9,733,353 B1
(45) Date of Patent: Aug. 15, 2017

(54) OFFSET FEED ANTENNAS

(71) Applicant: L-3 Communications Security and Detection Systems, Inc., Woburn, MA (US)

(72) Inventors: Douglas O. Carlson, Winter Garden, FL (US); Herbert Duvoisin, III, Orlando, FL (US); Christopher Gary Sentelle, Orlando, FL (US)

(73) Assignee: L-3 Communications Security and Detection Systems, Inc., Woburn, MA (US)

(*) Notice: Subject to any disclaimer, the term of this patent is extended or adjusted under 35 U.S.C. 154(b) by 246 days.

(21) Appl. No.: 14/598,428

(22) Filed: Jan. 16, 2015

Related U.S. Application Data

(60) Provisional application No. 61/928,141, filed on Jan. 16, 2014.

(51) Int. Cl.
*G01S 13/88* (2006.01)
*G01S 7/40* (2006.01)
*G01V 3/10* (2006.01)
*G01S 13/86* (2006.01)
*H01Q 9/27* (2006.01)
*H01Q 1/38* (2006.01)
*H01Q 11/08* (2006.01)

(52) U.S. Cl.
CPC .......... *G01S 13/885* (2013.01); *G01S 7/4004* (2013.01); *G01S 13/86* (2013.01); *G01S 13/88* (2013.01); *G01V 3/105* (2013.01); *G01S 13/887* (2013.01); *G01S 13/888* (2013.01); *H01Q 1/38* (2013.01); *H01Q 9/27* (2013.01); *H01Q 11/083* (2013.01)

(58) Field of Classification Search
CPC ...... G01S 13/88; G01S 13/885; G01S 13/887; G01S 13/888; H01Q 1/36; H01Q 9/27; H01Q 11/083
USPC ............................................................ 342/22
See application file for complete search history.

(56) References Cited

U.S. PATENT DOCUMENTS

| | | | | |
|---|---|---|---|---|
| 3,034,121 A * | 5/1962 | Riblet | ...................... | H01Q 9/27 343/770 |
| 3,530,486 A | 9/1970 | Strider | | |
| 3,787,871 A * | 1/1974 | Reese | ...................... | H01Q 9/27 343/895 |
| 5,146,234 A * | 9/1992 | Lalezari | ................... | H01Q 1/36 343/859 |
| 5,325,095 A * | 6/1994 | Vadnais | .............. | G01S 13/0209 342/129 |
| 5,680,048 A * | 10/1997 | Wollny | ................... | F41H 11/12 324/329 |
| 5,815,122 A * | 9/1998 | Nurnberger | .............. | H01Q 9/27 343/767 |
| 6,067,058 A * | 5/2000 | Volman | ..................... | H01Q 1/36 343/846 |

(Continued)

*Primary Examiner* — Peter Bythrow
(74) *Attorney, Agent, or Firm* — Fish & Richardson P.C.

(57) ABSTRACT

An apparatus for detecting objects includes a transceiver configured to generate a radar signal, a radar having a transmit antenna configured to transmit the radar signal, and a receive antenna configured to sense a return signal in response to a transmission of the radar signal. The apparatus also includes a processor configured to detect an object based on the return signal. One or more of the transmit antenna or the receive antenna include offset spiral feed antennas.

20 Claims, 14 Drawing Sheets

(56) References Cited

U.S. PATENT DOCUMENTS

| | | | | |
|---|---|---|---|---|
| 6,137,453 | A * | 10/2000 | Wang | H01Q 1/36 343/700 MS |
| 6,445,334 | B1 * | 9/2002 | Bradley | G01S 7/20 342/195 |
| 6,452,568 | B1 * | 9/2002 | Zidek | H01Q 1/36 343/700 MS |
| 7,333,045 | B1 * | 2/2008 | Aomori | G01S 13/88 342/175 |
| 7,345,618 | B1 * | 3/2008 | Cole | G01S 13/32 342/22 |
| 7,532,127 | B2 * | 5/2009 | Holman | G01V 3/15 324/233 |
| 7,535,407 | B2 * | 5/2009 | Cloutier | G01V 3/15 324/326 |
| 7,834,801 | B2 * | 11/2010 | Waite | G01S 13/86 324/329 |
| 9,437,932 | B1 * | 9/2016 | Freeman | H01Q 9/27 |
| 2003/0117325 | A1 * | 6/2003 | Jo | H01Q 1/243 343/702 |
| 2004/0032376 | A1 * | 2/2004 | Ikramov | H01Q 1/36 343/895 |
| 2005/0083244 | A1 | 4/2005 | Alexopoulos et al. | |
| 2006/0152411 | A1 * | 7/2006 | Iguchi | H01Q 1/36 343/700 MS |
| 2006/0284758 | A1 * | 12/2006 | Stilwell | G01V 3/15 342/22 |
| 2008/0266194 | A1 * | 10/2008 | Huynh | H01Q 1/243 343/767 |
| 2009/0262006 | A1 * | 10/2009 | McNeill | G01S 7/35 342/22 |
| 2009/0267859 | A1 * | 10/2009 | Koh | H01Q 1/2225 343/860 |
| 2009/0315798 | A1 * | 12/2009 | Nam | H01Q 1/243 343/787 |
| 2010/0085234 | A1 * | 4/2010 | Steinway | G01V 3/15 342/22 |
| 2013/0307716 | A1 * | 11/2013 | Mohamadi | G01S 13/887 342/22 |

\* cited by examiner

OFFSET FEED ANTENNAS

CROSS-REFERENCE TO RELATED APPLICATIONS

This application claims the benefit of U.S. Provisional Application No. 61/928,141, filed Jan. 16, 2014, the contents of which are incorporated by reference.

TECHNICAL FIELD

This disclosure relates to antennas for ground penetrating radar.

BACKGROUND

Ground penetrating radar (GPR) is used to detect subsurface objects. For example, GPR may be used to detect land mines or improved explosive devices (IEDs).

SUMMARY

According to one aspect, an apparatus for detecting objects may include a transceiver configured to generate a radar signal, a radar having a transmit antenna configured to transmit the radar signal, and a receive antenna configured to sense a return signal in response to a transmission of the radar signal. The apparatus may also include a processor configured to detect an object based on the return signal. One or more of the transmit antenna or the receive antenna may include offset spiral feed antennas.

Implementations of this aspect may include one or more of the following features. For example, the offset spiral feed antenna may include an antenna with a substantially spiral shaped feed with a central point that is offset from a center of the antenna. The receive antenna and the transmit antenna may both include offset spiral feed antennas and the central points of the feeds may be offset from the centers of the antennas in directions away from the other antenna. Each feed may be configured so that a line, from the central point of the feed to a portion of the feed that is widest at a perimeter of the antenna, substantially points to a same point. The apparatus may include a second receive antenna that includes an offset spiral feed. The offsets of the central points, spiral growth rates, and starting angles of the spirals of the transmit antenna, the receive antenna, and the second receive antenna may be configured such that squinted beams corresponding to the transmit antenna, the receive antenna, and the second receive antenna substantially intersect at the same point.

The processor may be configured to calibrate the return signal based on amounts of the offsets and detect an object based on the calibrated return signal. The spiral shaped feed may be a logarithmic spiral shaped feed, an Archimedean spiral shaped feed, or a spiral that begins from the central point as a logarithmic spiral shaped and then becomes an Archimedean spiral shaped feed. The spiral shaped feed may be configured such that signals at higher frequencies are more squinted than signals at lower frequencies.

The apparatus may include a continuous wave metal detector. The continuous wave metal detector may include a transmission coil around the antennas configured to transmit a set of lower frequency signals and a receive coil that overlaps the antennas configured to sense return signals in response to a transmission of the set of lower frequency signals. The processor may be configured to detect the object based on the return signal sensed by the receive antenna and the return signals received by the receive coil of the continuous wave metal detector.

Implementations of the techniques discussed above may include a method or process, a system or apparatus, a sensor head, a sensor, a kit, or computer software stored on a computer-accessible medium. The details of one or more implementations are set forth in the accompanying drawings and the description below. Other features will be apparent from the description and drawings, and from the claims.

DETAILED DESCRIPTION

Figure 1:
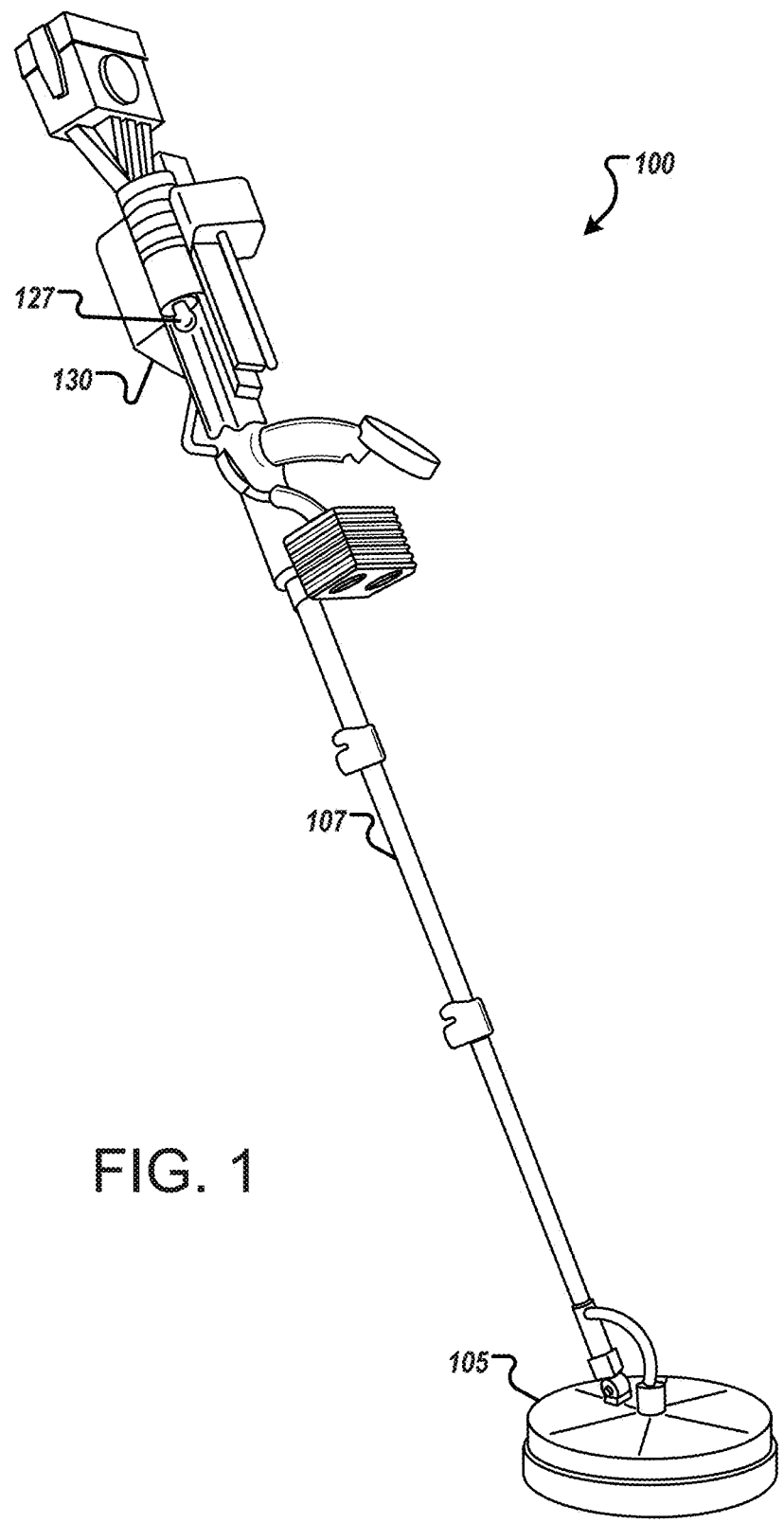
FIG. 1 shows an example hand-held detection system.

FIG. 1 shows an example hand-held detection system 100. The detection system 100 may be used to detect subsurface objects, e.g., land mines, rocks, pipes, IEDs, coins, artifacts, etc. The detection system 100 includes a sensor head 105 attached to a wand 107. The sensor head 105 may include antennas for a GPR. GPR may detect objects based on return signals that are reflections of a transmitted radar signal. For example, the sensor head 105 may include a first antenna that transmits a radar signal which is then reflected off a subsurface object and sensed by a second antenna as a return signal. The detection system 100 may then analyze the return signal to detect the object.

As the detection system may have a limited detection area, an operator may sweep the sensor head 105 across a region using the wand 107. For example, if the sensor head 105 may only detect an object within a three inch wide swath, an operator may sweep the sensor back and forth so that the sensor head 105 eventually senses for subsurface objects for the entire region. However, the sweeping process may be time consuming and may be inaccurate. For example, an operator of the detection system 100 may accidentally omit sweeping across a portion of the region. In another example, the operator may sweep the same portion of a region multiple times. Increasing a detection area of the detection system 100 may result in faster or more accurate results. For example, increasing a detection swath to be five or more inches may result in less number of sweeps needed to cover the same region and fewer portions of the region may be accidentally omitted or overlapped. As described in more detail in the following figures, the detection area of the detection system 100 may be increased by using offset spiral feed antennas instead of non-offset spiral feed antennas.

The detection system 100 may further include a transceiver 127 to generate a radar signal for antennas of the sensor head 105 to transmit and receive a return signal. The transceiver 127 may be included in the sensor head 105 such that the cabling that carries data to and from the sensor head 105 may be simplified. However, in other implementations, the transceiver 127 may be located outside of the sensor head 105 and coupled to the wand 107.

The detection system 100 may include a processor 130 that receives the return signal and detects an object based on the return signal. In some implementations, the processor 130 may calibrate the return signal based on a configuration of the offset spiral feed antenna. The processor 130 may be integrated with the sensor head 150 or the sensor head 150 may be separate and removed from the processor 130. In examples in which the sensor head 150 is separate from the processor 130, the processor 130 and the sensor head 150 may be in communication while the sensor head 150 is operating such that the processor 130 receives data from the sensor head 150 and analyzes the data as the sensor head 150 operates.

The detection system 100 may also include an output system that may provide an indication to an operator of the system 100 that an object has been detected. The output system may be, for example, an audio speaker, display, haptic feedback device, etc.

Figure 2A:
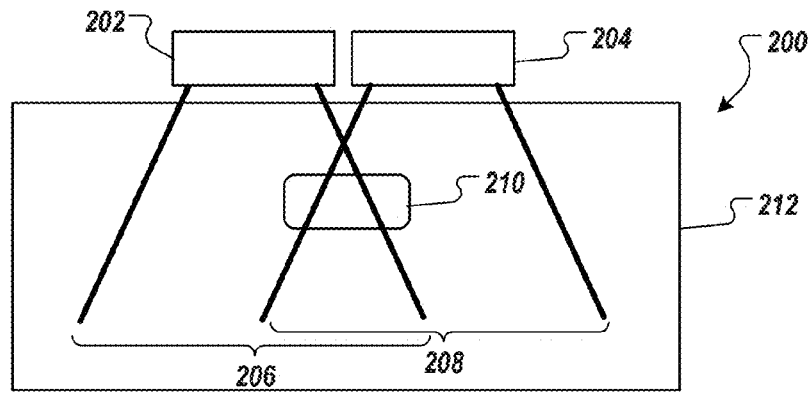
FIGS. 2A-2C show example configurations of antennas.
Figure 2B:
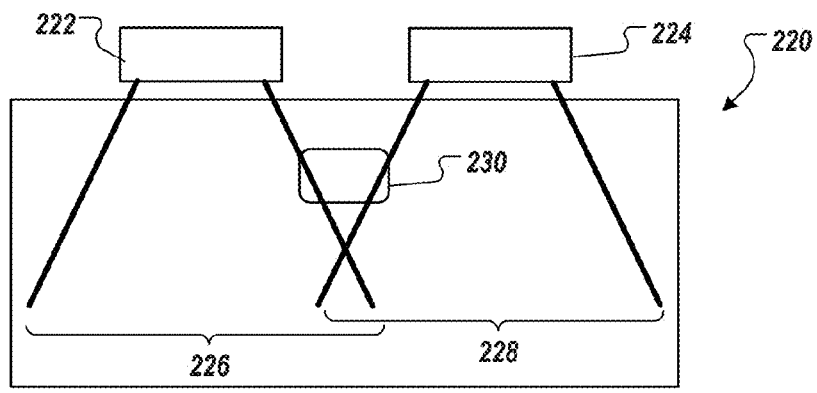
Figure 2C:
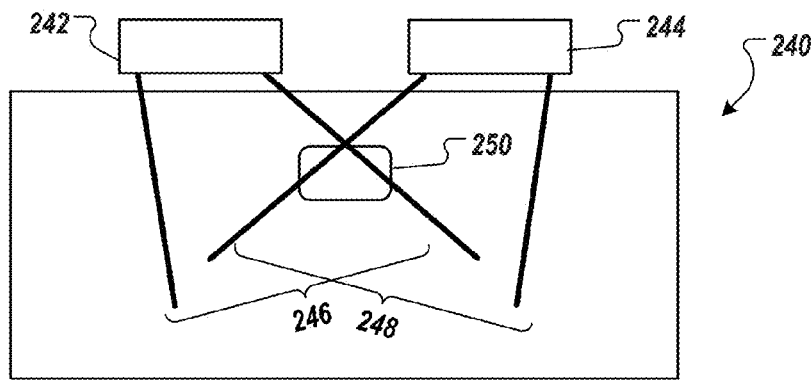

FIGS. 2A-2C show example configurations of antennas. FIG. 2A shows an example antenna configuration 200 with non-offset spiral feed antennas 202 and 204. Beams 206, 208 may correspond with antennas 202, 204, respectively, and may be substantially orthogonal to the plane of the antennas, e.g., the plane that includes substantially the entire spirals of the antennas. For example, when the spiral feeds of antennas 202, 204 are substantially parallel to the ground 212, the beams of the antennas 202, 204 may substantially point orthogonal to the ground. The spiral feeds may be made of copper or other conductive material. As shown, the antenna configuration 200 may be used to detect a subsurface object 210. For example, a third antenna, not shown, may transmit a radar signal that is reflected off the subsurface object 210 and the antennas 202, 204 may sense return signals that originate from within their respective beams 206, 208.

In an example, the antenna configuration 200 may result in the ability to detect objects within a three inch swath. Thus, an operator of a detection system using the antenna configuration 200 may detect subsurface objects in a region by sweeping a sensor head including the antenna configuration 200 from one side to another, then moving the sensor head three inches forward, then sweeping the sensor head back to the other side, and repeating until all portions of the region in which to detect subsurface objects is covered.

FIG. 2B shows an example antenna configuration 220 with non-offset spiral feed antennas 222, 224. The non-offset spiral feed antennas 222, 224 may be spaced further apart so that their beams 226, 228 cover a wider area. Accordingly, the antenna configuration 220 may result in a detection swath of five inches or more. However, as the non-offset spiral feed antennas 222, 224 are spaced further apart in the antenna configuration 220, neither of the beams 226, 228 may be able to detect shallow subsurface objects 230 that are located between the antennas 222, 224. For example, as shown in FIG. 2B, the object 230 may not be detected as it is not entirely within either of the beams 226, 228 of the antennas.

FIG. 2C shows an example antenna configuration 240 with offset spiral feed antennas 242, 244. The offset spiral feed antennas 242, 244 may be antennas that include spiral feeds with a central point that is offset from the center of the antennas 242, 244, as described in more detail in the following figures. As a result of the offset, the offset spiral feed antennas 242, 244 may have beams 246, 248 that are squinted, or in other words, beams that are angled in respect to a central axis of the spiral, which is orthogonal to the plane of the antennas. For example, the beams 246, 248 may be transmitted with an angle of transmission that is 30 degrees (or more or less depending on the details of the design of the antenna) from the central axis of the spiral. Accordingly, even though the offset spiral feed antennas 242, 244 may be spaced further apart from one another, the antennas configuration 240 may still be able to detect shallow subsurface objects 250.

The offset spiral feed antennas 242, 244 may also have beams that have greater angles, i.e., more squinted, at higher frequencies and lower angles, i.e., less squinted, for lower frequencies. Higher frequencies may have less penetrative power and may be used to detect objects at more shallow depths and lower frequencies may have more penetrative power and may be used to detect objects at deeper depths. Accordingly, at higher frequencies, the beams of the antenna configuration 240 may resemble beams 246, 248 and at lower frequencies the beams of the antenna configuration 240 may resemble beams 226, 228 in FIG. 2B. Therefore, the antenna configuration 240 may result in a detection system that has a wider detection area and can still detect shallow objects between the antennas 242, 244.

Figure 3:
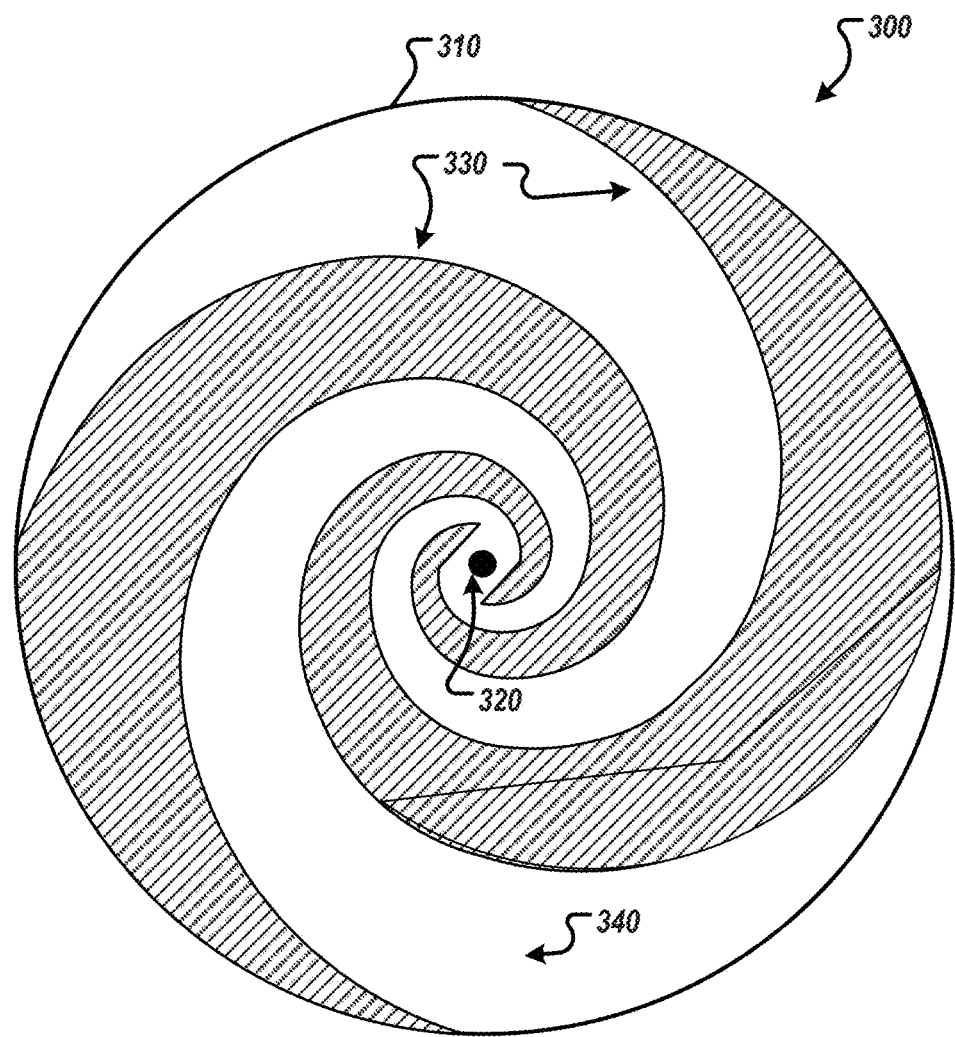
FIG. 3 shows an example non-offset spiral feed of an antenna.

FIG. 3 shows an example non-offset spiral feed of an antenna 300. The spiral feed antenna 300 includes a substantially circular perimeter 310, a center 320, a spiral feed 330, and a spiral shaped absorber 340. The spiral feed 330 shown is a logarithmic spiral. The spiral feed 330 may include two arms and the central point of the spiral feed 330 may be at the same point as the center 320 of the antenna, i.e., the offset between the central point of the spiral feed 330 and the center 320 of the antenna is substantially zero. As discussed above, a beam from the non-offset spiral feed antenna 300 may be substantially parallel with a central axis of the spiral feed 330, e.g., orthogonal to the plane of the antenna.

Figure 4:
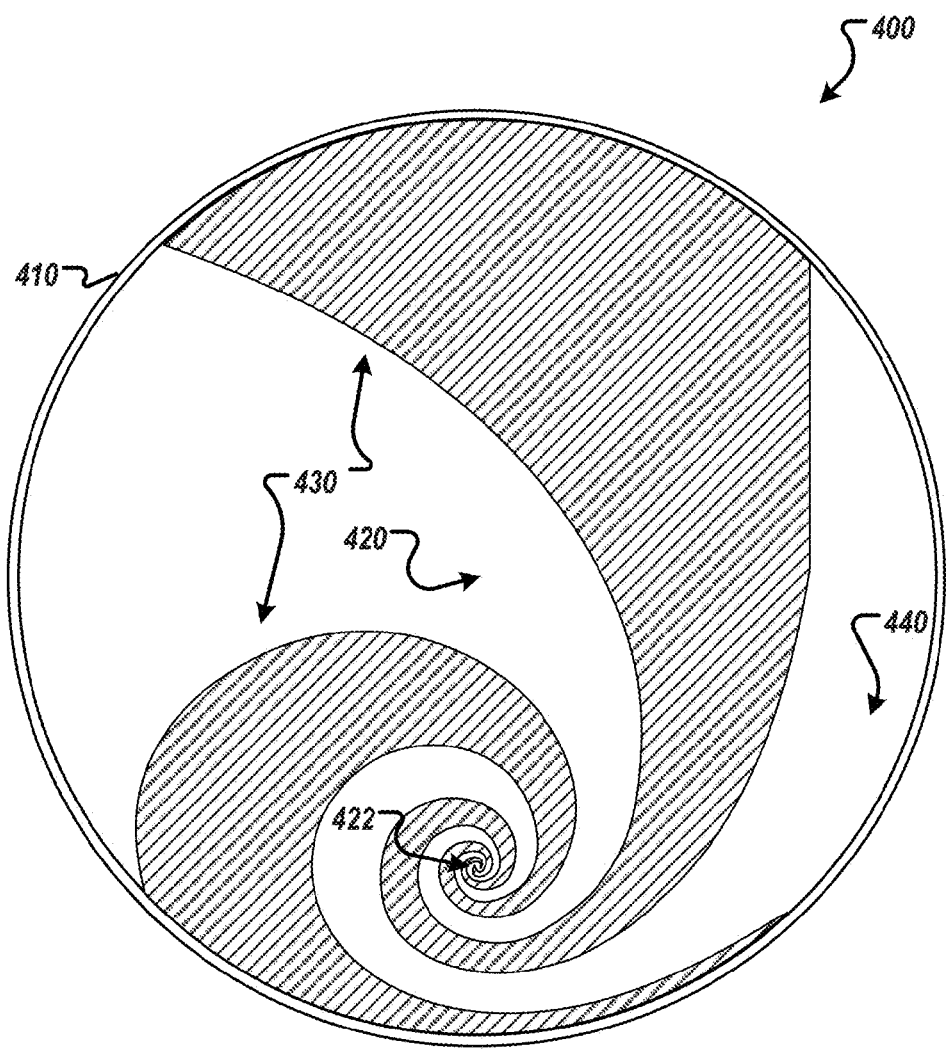
FIG. 4 shows an example offset logarithmic spiral feed.

FIG. 4 shows an example offset logarithmic spiral feed 400. The offset spiral feed antenna 400 includes a substantially circular perimeter 410, a center 420, a spiral feed 430 made of a conducting material, and a spiral shaped non-conducting area 440. The spiral feed 430 shown is a logarithmic spiral that includes arms and a central point 422 that is offset from the center 420 of the antenna 400. For example, the central point 422 of the spiral feed 430 may be offset so that it is two thirds of the radius, three fourths, or some other distance offset from the center 420 of the antenna 400. As discussed above, at higher frequencies a beam from the offset spiral feed antenna 400 may be a squinted beam that is angled from a central axis of the spiral feed 430, which is orthogonal to the plane of the antenna 400, and at lower frequencies a beam from the offset spiral feed antenna 400 may be less angled from the central axis.

In particular, the beam may be angled in a direction opposite to the direction of the offset of the central point 422. For example, when the central point 422 is offset downwards from the center 420 of the antenna 400, as shown in FIG. 4, the beam may be angled in a direction upwards from the central point 422. In another example, when the central point 422 is offset to the left from the center 420 of the antenna 400, the beam may be angled in a rightward direction from the central point 422.

Figure 5:
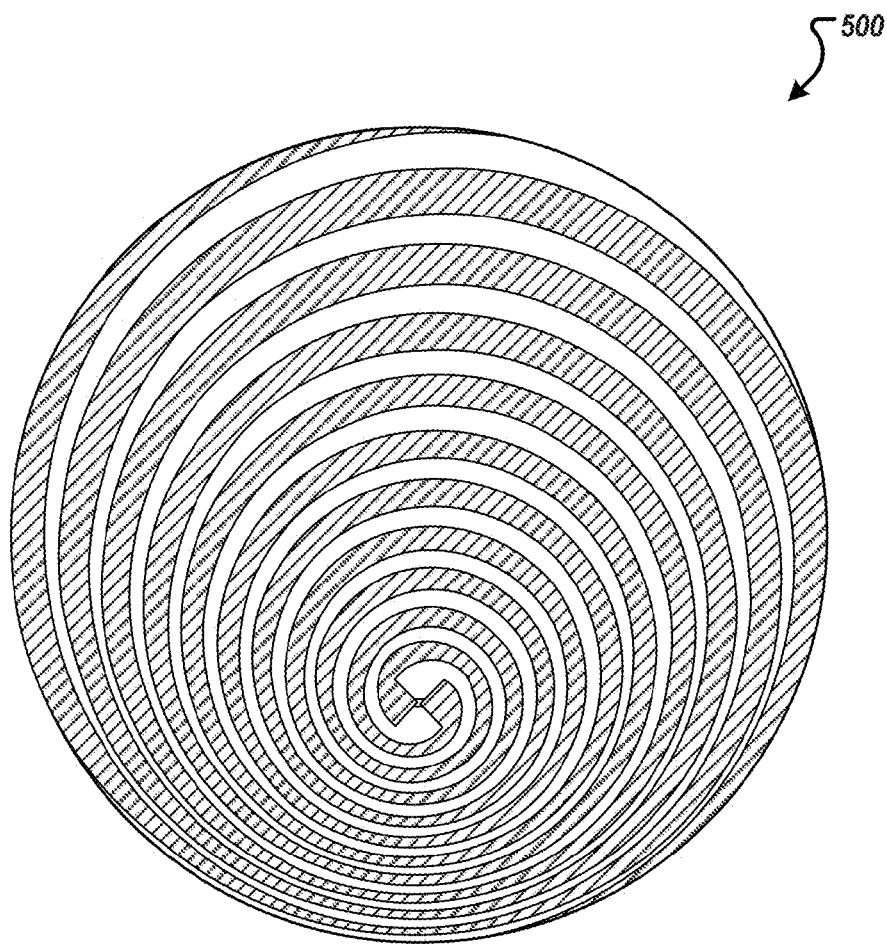
FIG. 5 shows an example offset Archimedean spiral feed.

FIG. 5 shows an example offset Archimedean spiral feed 500. The offset Archimedean spiral feed 500 may be similar to the offset logarithmic spiral feed 400, particularly in the offset of the central point of the spiral feed. However, the offset Archimedean spiral feed 500 may differ in that there is a more constant separation distance between turns of the spiral. The offset Archimedean spiral feed 500 may produce less squinting, a beam with less of an angle from the central axis, than an offset logarithmic spiral feed as the adjacent portions of the spiral may be more strongly coupled.

Figure 6:
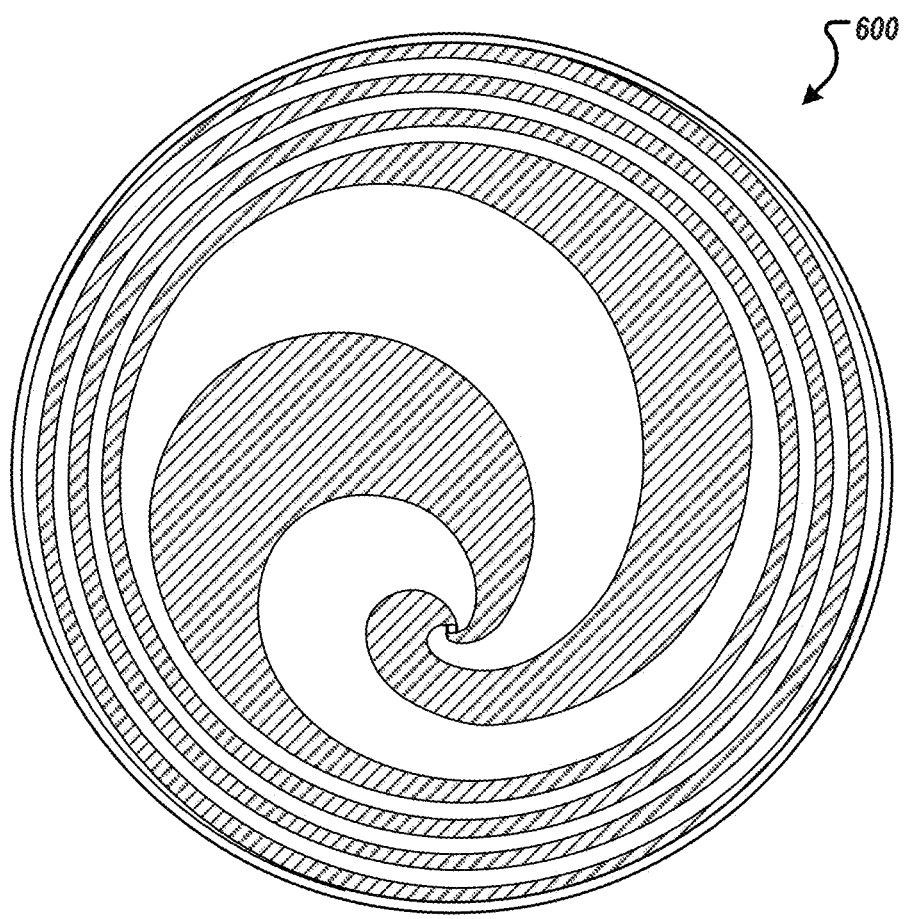
FIG. 6 shows an example offset hybrid logarithmic and Archimedean spiral feed.

FIG. 6 shows an example offset hybrid logarithmic and Archimedean spiral feed antenna 600. The offset hybrid spiral feed antenna 600 may have a spiral feed that initially begins from a central point as a logarithmic spiral and then transitions into an Archimedean spiral. The hybridization of the two types of spirals may provide beam steering at high frequencies with improved circular polarization at lower frequencies. The hybrid spiral feed 600 may use a linearly varying growth rate. However, quadratic, cubic, or higher order varying growth rates may be used instead. An example equation for the hybrid spiral feed 600 is shown below:

$$x(\theta) = r_0 \exp(\alpha\theta - \beta\theta^p)(\cos(\theta - \phi) + k_o) - r_N k_o$$

$$y(\theta) = r_0 \exp(\alpha\theta - \beta\theta^p)(\sin(\theta - \phi))$$

$$\theta = [0, \theta_m]$$

to find $\theta_m$ for p=2 solve $$(\alpha r_N + \rho)\theta_m + \alpha r_N k_o \theta_m \cos(\theta_m) - 2r_N k_o \ln(r_N/r_o)\cos(\theta_m) = 2r_N \ln(r_N/r_o)$$

Given $\theta_m$ solve for $\beta$ $$\beta = [\alpha - \rho/r_N(1 + k_o \cos(\theta_m))]/2\theta_m$$

Log spiral satisfies, $$\left.\frac{dr(\theta)}{d\theta}\right|_{\theta=\theta_m} = \rho$$

$r_0$ may represent a feed radius, $\alpha$ may represent an initial growth rate, $\beta$ may represent a varying growth rate constant, p may represent a varying growth rate power, $\phi$ may represent an arm starting angle, $\rho$ may represent an Archimedean growth rate, $r_N$ may represent an ending radius for log spiral, and $k_o$ may represent an eccentricity.

The Archimedean spiral may start at the end of the eccentric log-spiral and grow to the outer radius using the below equation.

$$x(\theta) = r_N + \rho\theta \cos(\theta - \phi + \theta_m)$$

$$y(\theta) = r_N + \rho\theta \sin(\theta - \phi + \theta_m)$$

$$\theta = [0, (r_{out} - r_N)/\rho]$$

In some implementations, other offset spiral feeds may be used for the antennas. For example, an offset feed bowtie, of which the log-spiral is a variant, or a twisted bowtie, may be used. The offset feed bowtie may exhibit the squinting behavior of the log-spiral, but over a narrower band.

Figure 7:
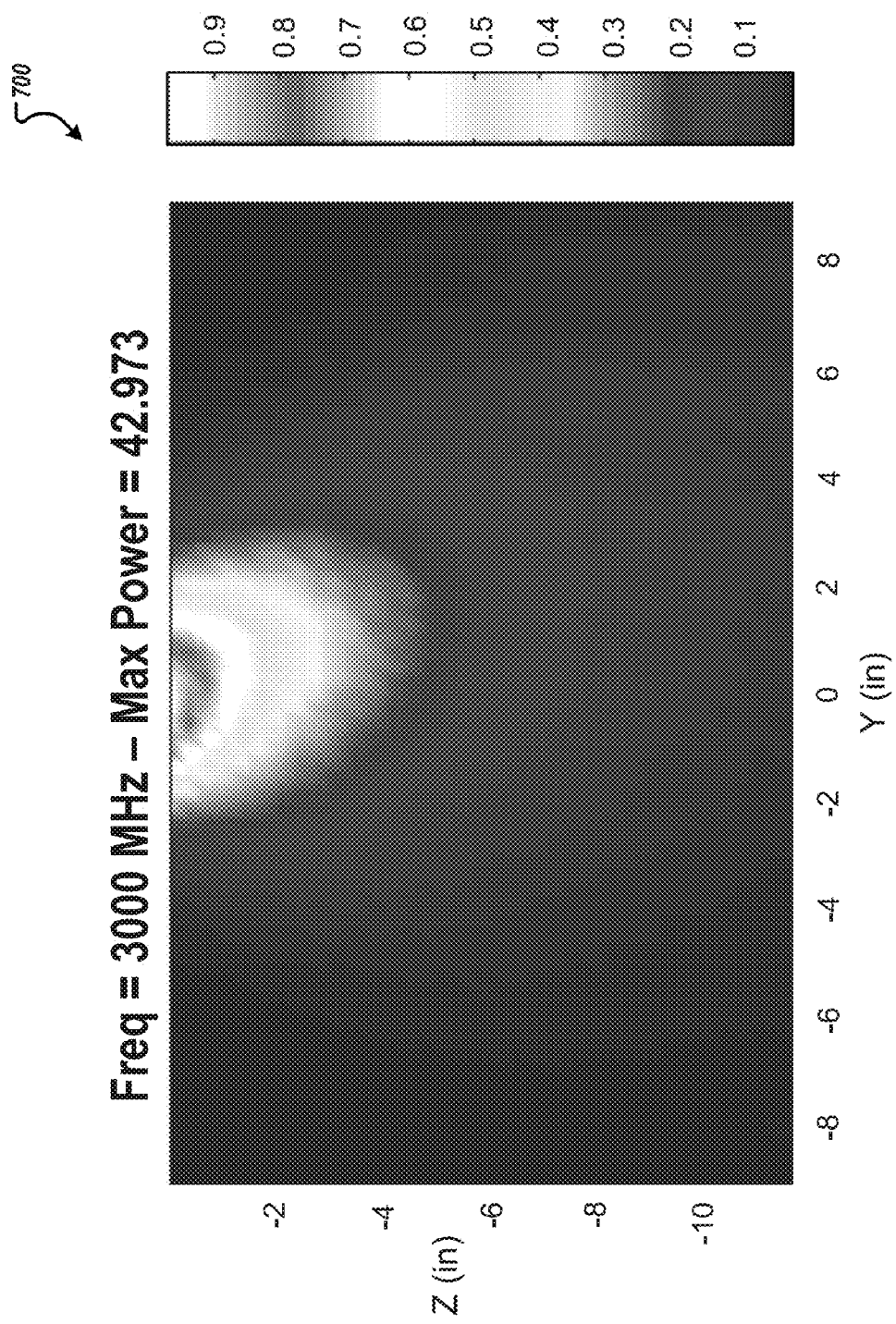
FIGS. 7 and 8 show example graphs of performances of offset feed antennas.
Figure 8:
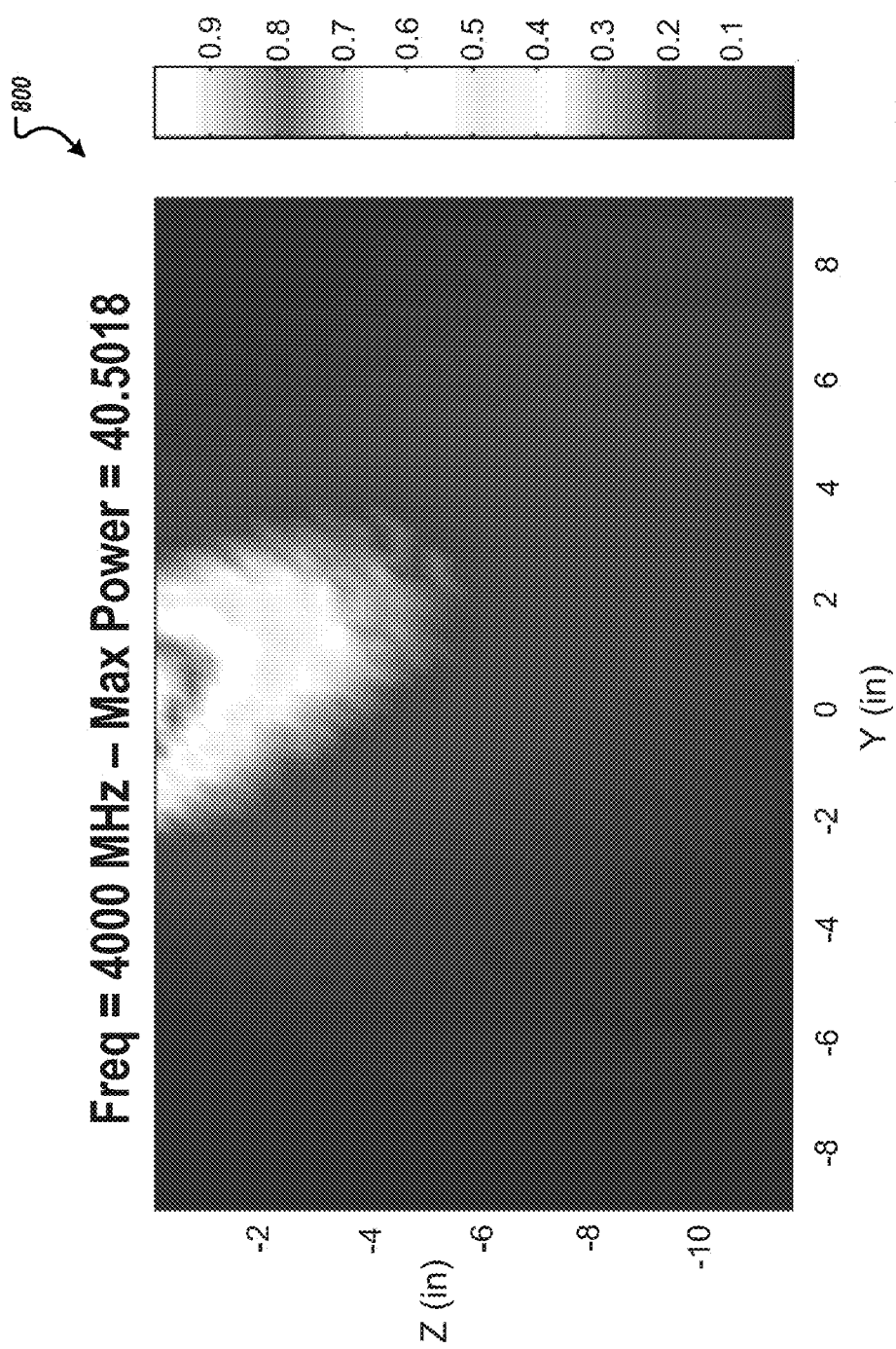

FIGS. 7 and 8 show example graphs of performances of offset feed antennas. FIG. 7 illustrates a graph 700 of how at a frequency of 3 GHz a beam from an offset spiral feed antenna may be squinted. FIG. 8 illustrates a graph 800 of how at a higher frequency of 4 GHz a beam from an offset spiral feed antenna may be even more squinted than a beam at 3 GHz.

Figure 9:
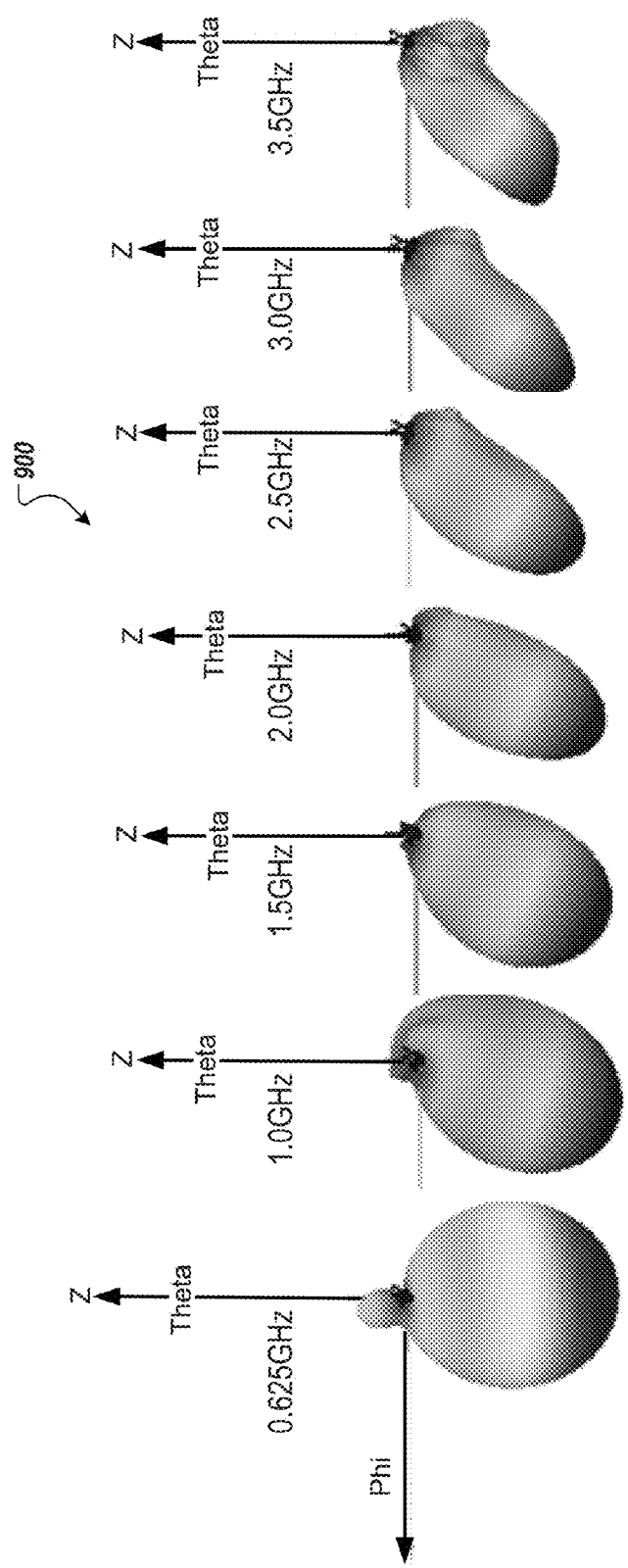
FIG. 9 shows example far-field patterns of an offset feed antenna.

FIG. 9 shows example far-field patterns of an offset feed antenna. The far-field patterns correspond to frequencies ranging from 0.625 GHz to 3.5 GHz for an offset spiral feed antenna. As shown in FIG. 9, as the frequency increases the amount of squinting increases. The offset spiral feed antenna corresponding to FIG. 9 may have a spiral with a central point offset to the right of the center of the antenna to result in the far-field patterns that are angled to the left.

Figure 10:
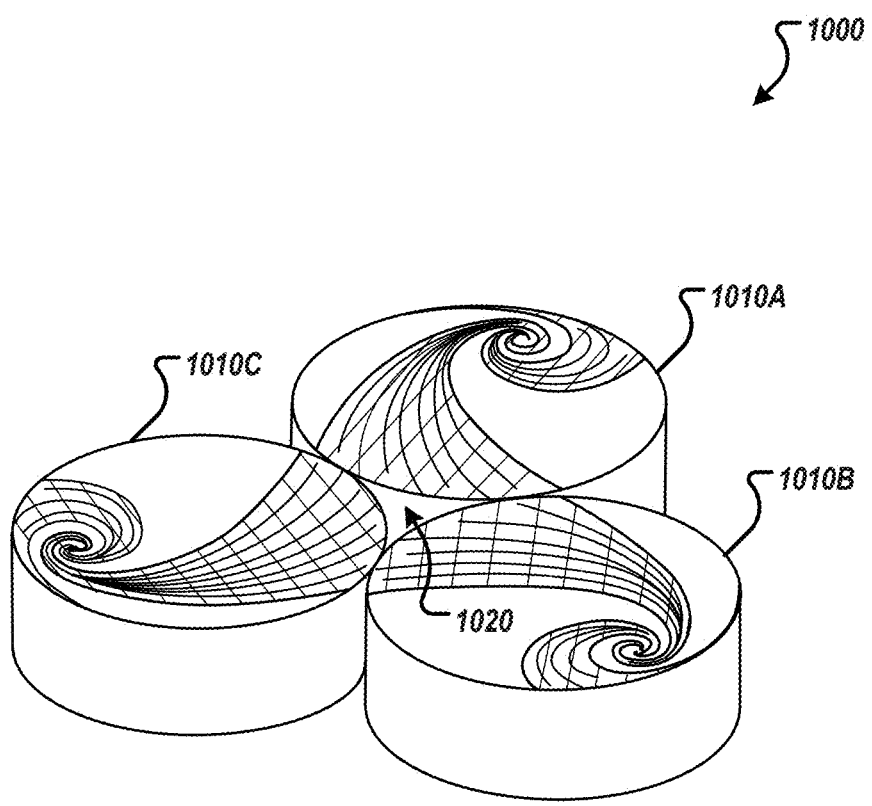
FIG. 10 shows an example configuration of multiple offset feed antennas.

FIG. 10 shows an example configuration 1000 of multiple offset feed antennas. The multiple offset feed antennas may include two receiving offset spiral feed antennas 1010A, 1010B, and one transmitting offset spiral feed antenna 1010C. The offset spiral feed antennas 1010 may be arranged so that they share a same plane, e.g., are parallel and their beams are squinted towards a single point 1020. The single point 1020 may be the center of the configuration 1000 between the multiple offset feed antennas 1010. Accordingly, (i) each central point of a spiral of an offset feed antenna may be offset from the center of the offset feed antenna in a direction that is away from the single point and (ii) each of the spirals of the offset feed antennas may also be formed with an arm starting angle and growth rate such that a line, from the central point of the spiral to the portion of the conducting material that is widest at the perimeter of the antenna, from all the antennas point to the single point.

Figure 11:
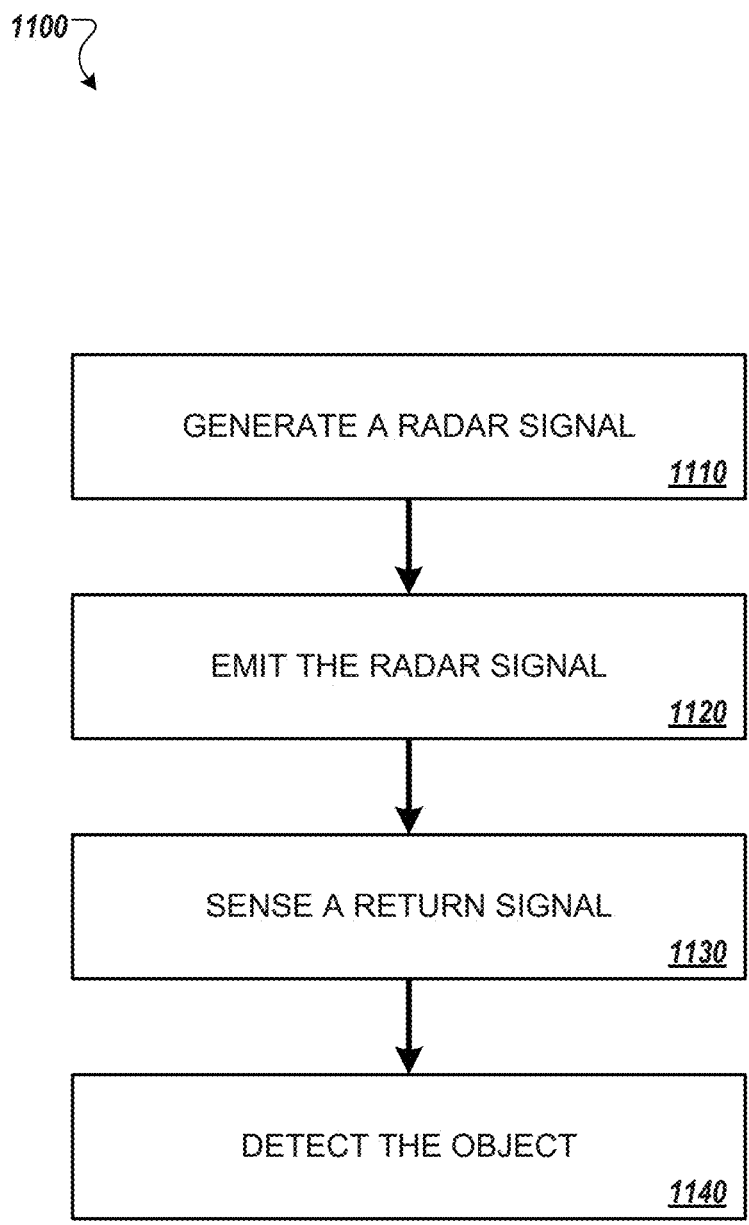
FIG. 11 is an example process for detecting an object using offset feed antennas.

FIG. 11 is an example process 1100 for detecting an object using offset feed antennas. The following describes the process 1100 as being performed by components of the system 100 that are described with reference to FIG. 1. However, the process 1100 may be performed by other systems or system configurations. The process 1100 may be performed by the processor 130. The process 1100 may include generating a radar signal (1110). For example, a transceiver 127 of the system 100 may generate a radar signal to be emitted across a range of frequencies. The process 1100 may include emitting the radar signal towards an object using an offset spiral feed antenna (1120). For example, an offset spiral feed antenna in the sensor head 105 may receive a radar signal from the transceiver 127 and in response, emit the radar signal towards a subsurface object. The process 1100 may include sensing a return signal using a second offset spiral feed antenna (1130). The sensing may be in response to emitting the radar signal towards the object using the offset spiral feed antenna. For example, a second offset spiral feed antenna may receive a return signal that is a reflection of the emitted signal off the subsurface object. The process 1100 may include detecting the object (1140). Detecting the object may be in response to sensing the return signal using the second offset spiral feed antenna. For example, a processor 130 may receive the return signal and determine the presence of an object based on the return signal.

In some implementations, detecting the object may include calibrating the return signal. For example, using an offset spiral feed antenna may result in a return signal that is affected by factors including one or more of an amount of offset, an initial growth rate, a varying growth rate of the spiral, an arm starting angle, and a feed radius. Accordingly, the processor may calibrate the return signal based on the factors, and then detect the object based on the calibrated return signal.

Figure 12A:
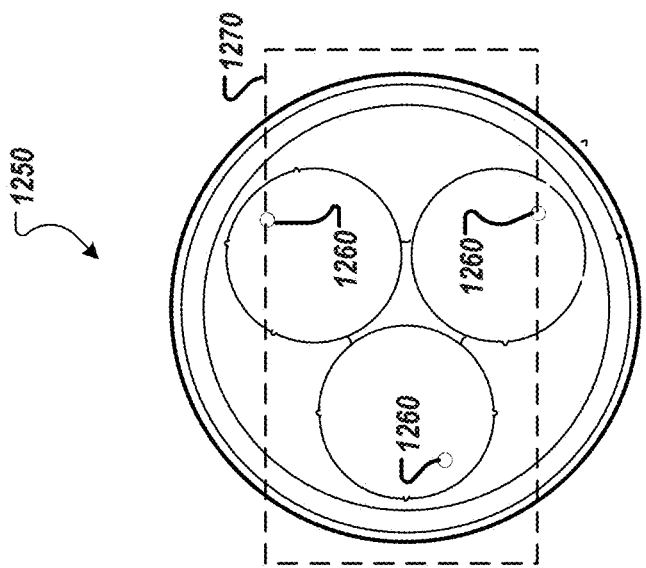
FIGS. 12A and 12B show example footprints of detection systems.
Figure 12B:
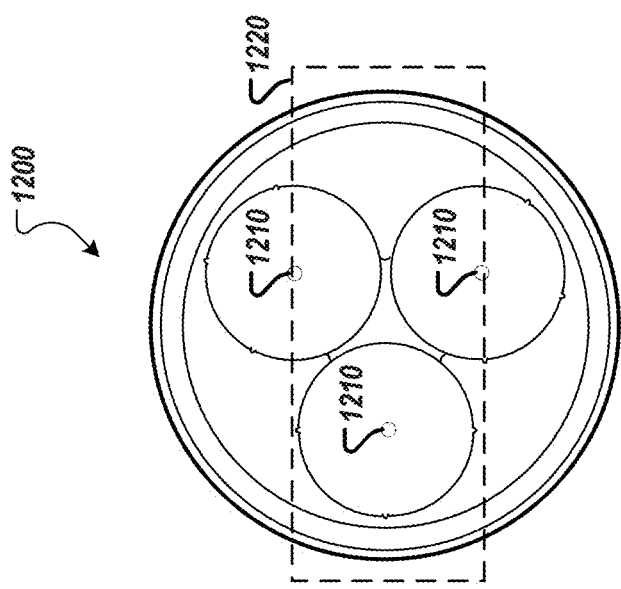

FIGS. 12A and 12B show example sensor heads and footprints of the detection systems. FIG. 12A shows an example sensor head configuration 1200 of antennas with non-offset spiral feeds with central points 1210 and a footprint 1220. FIG. 12B shows an example second sensor head configuration 1250 of antennas with offset spiral feeds with central points 1260 and a second footprint 1270. As shown, the second footprint 1270 of the offset spiral feed antennas may be substantially wider, e.g., from three inches to six inches, than the footprint 1220 of the non-offset spiral feed antennas.

Figure 13:
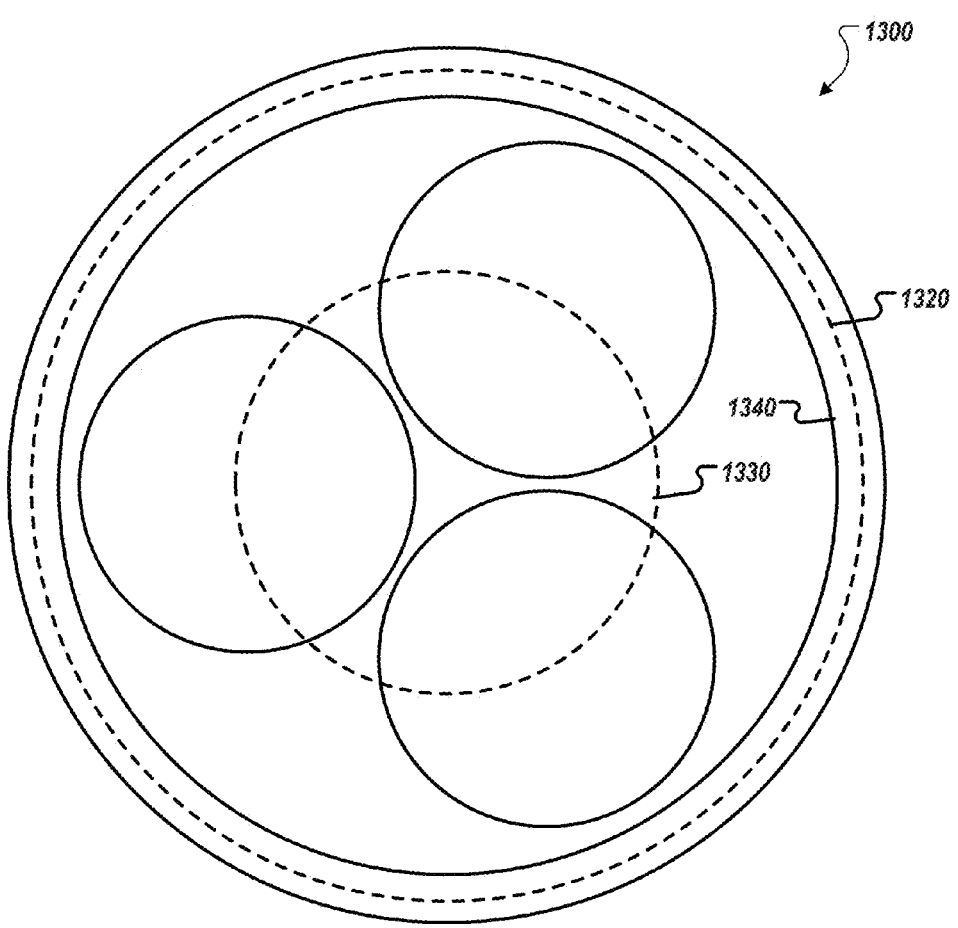
FIG. 13 shows an example configuration of multiple offset feed antennas and a metal detector.

FIG. 13 shows an example sensor head configuration 1300 of multiple offset spiral feed antennas and a metal detector. The metal detector may be a continuous-wave metal detector (CWMD) that is specialized to detect metal. The CWMD may include CWMD coils 1320, 1330. The CWMD coils 1320, 1330 may be in a plane that is above a plane of the antennas. For example, the CWMD coils 1320, 1330 may be in a plane one centimeter above a plane that includes the feeds of the antennas. The CWMD coils may include a transmission coil 1320 and a receive coil 1330. The transmission coil 1320 may be configured around an inner housing 1340 that is around the antennas so as not to overlap with the antennas and the receive coil 1330 may be configured to overlap the offset spiral feed antennas. In one example, the receive coil 1330 may overlap the centers of the offset spiral feed antennas and not enclose any of the central points of the offset spiral feeds. Having antennas with offset spiral feeds for the GPR may enable a receive coil 1330 of sufficient size to match the GPR swath, to be positioned within the central points of the offset spiral feed antennas.

Figure 14:
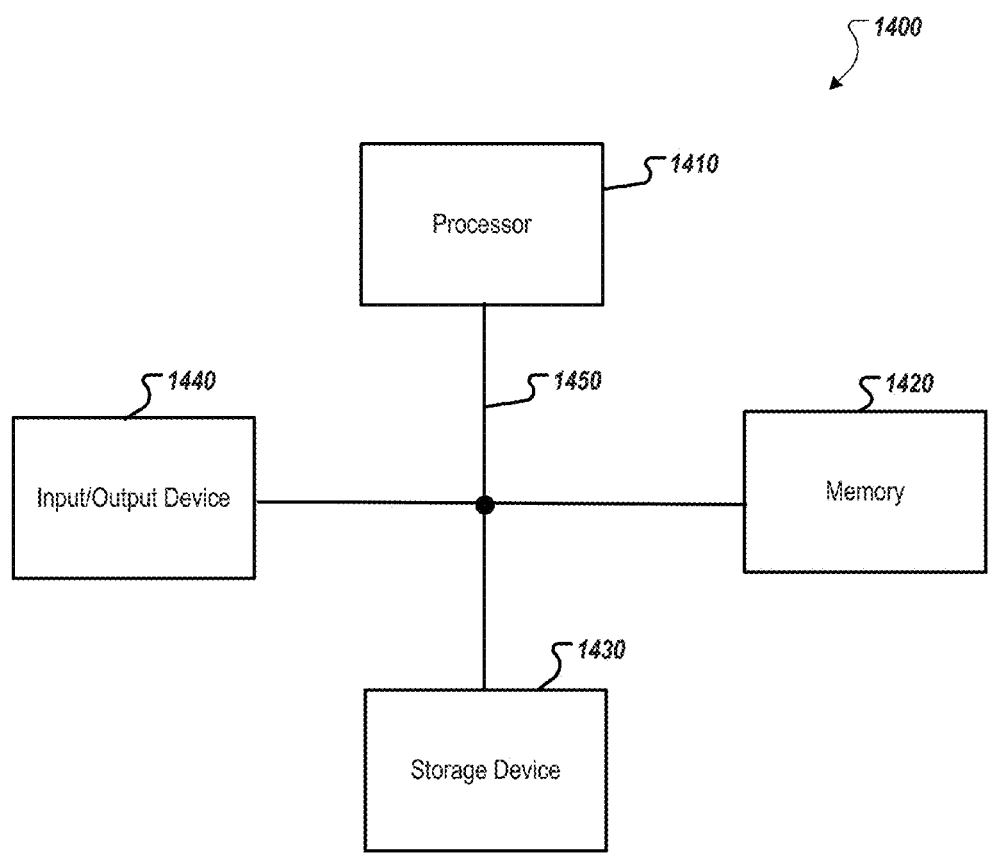
FIG. 14 is a block diagram of a computer system that can be used in the operations and systems.
Like reference numbers refer to like elements.

FIG. 14 is a block diagram of a computer system 1400 that can be used in the operations and systems described above, according to one implementation. The system 1400 includes a processor 1410, a memory 1420, an electronic storage 1430 and an input/output interface 1440. Each of the components 1410, 1420, 1430 and 1440 are interconnected using a system bus 1450. The processor 1410 is capable of processing instructions for execution within the system 1400. In some implementations, the processor 1410 is a single-threaded processor. In another implementation, the processor 1410 is a multi-threaded processor. The processor 1410 is capable of processing instructions stored in the memory 1420 or on the electronic storage 1430 to display graphical information for a user interface on the input/output interface 1440. The processor 1410 may be coupled to another element, such as a sensor within the sensor head 105, 150 by being electrically coupled to the sensor and able to exchange data and signals with the sensor.

The memory 1420 stores information within the system 1400. In one implementation, the memory 1420 is a computer-readable medium. In another implementation, the memory 1420 is a volatile memory unit. In still another embodiment, the memory 1420 is a non-volatile memory unit.

The electronic storage 1430 is capable of providing mass storage for the system 1400. In one embodiment, the storage device 1430 is a computer-readable medium. In various different embodiments, the storage device 1430 may be a floppy disk device, a hard disk device, an optical disk device, or a tape device.

For example, the system 100, discussed previously with respect to FIGS. 1A-1E, may include the processor 1410 executing computer instructions that are stored in one of memory 1420 and a storage device 1430.

The input/output device 1440 provides input/output operations for the system 1400. In one implementation, the input/output device 1440 includes a keyboard and/or pointing device. In another implementation, the input/output device 1440 includes a display unit for displaying graphical user interface as discussed above.

The techniques can be implemented in digital electronic circuitry, or in computer hardware, firmware, software, or in combinations of them. The techniques can be implemented as a computer program product, that is, a computer program tangibly embodied in an information carrier, in a machine-readable storage device, in a machine-readable storage medium, in a computer-readable storage device, in a computer-readable storage medium, or in a propagated signal, for execution by, or to control the operation of, a data processing apparatus, such as a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps of the techniques can be performed by one or more programmable processors executing a computer program to perform functions of the techniques by operating on input data and generating output. Method steps can also be performed by, and an apparatus of the techniques can be implemented as, special purpose logic circuitry, on, for example, an FPGA (field programmable gate array) or an ASIC (application-specific integrated circuit).

Processors suitable for the execution of a computer program include, by way of example, both general and special purpose microprocessors, and any one or more processors of any kind of a digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, such as, magnetic or magneto-optical disks, or optical disks. Information carriers suitable for embodying computer program instructions and data include all forms of non-volatile memory, including by way of example semiconductor memory devices, such as, EPROM, EEPROM, and flash memory devices; magnetic disks, such as, internal hard disks or removable disks; magneto-optical disks; and CD-ROM and DVD-ROM disks. The processor and the memory can be supplemented by, or incorporated in special purpose logic circuitry.

A number of implementations of the techniques have been described. Nevertheless, it will be understood that various modifications may be made without departing from the spirit and scope of the claims. For example, useful results still could be achieved if steps of the disclosed techniques were performed in a different order and/or if components in the disclosed systems were combined in a different manner and/or replaced or supplemented by other components.

What is claimed is:

1. An apparatus comprising:
a transceiver configured to generate a radar signal;
a radar configured to transmit the radar signal, the radar comprising a first offset spiral feed (OSF) antenna that includes substantially spiral shaped feed arms with a central point of the feed arms being offset from a center axis of the first OSF antenna that is substantially orthogonal to a plane of the first OSF antenna;

a receive antenna configured to sense a return signal in response to a transmission of the radar signal, the receive antenna being a second OSF antenna that includes substantially spiral shaped feed arms with a central point of the feed arms being offset from a center axis of the second OSF antenna that is substantially orthogonal to a plane of the second OSF antenna; and a processor configured to detect an object based on the return signal, wherein the first and the second OSF antennas are arranged such that the central point of the feed arms of the first OSF antenna is offset from the center axis of first OSF antenna in a direction away from the second OSF antenna.

2. The apparatus of claim 1, wherein the apparatus comprises a second receive antenna that comprises a third OSF antenna.

3. The apparatus of claim 2, wherein the first, second and third OSF antennas are configured to have respective squinted beams that substantially intersect with each other at a common point.

4. The apparatus of claim 1, wherein the processor is configured to:

calibrate the return signal based on amounts of the offsets; and detect an object based on the calibrated return signal.

5. The apparatus of claim 1, wherein the spiral shaped feed arms of at least one of the first or the second OSF antenna comprise a logarithmic spiral shape.

6. The apparatus of claim 1, wherein the spiral shaped feed arms of at least one of the first or the second OSF antenna comprise an Archimedean spiral shape.

7. The apparatus of claim 1, wherein the spiral shaped feed arms of at least one of the first or the second OSF antenna comprise a spiral having a first portion with a logarithmic spiral shape and a second portion with an Archimedean spiral shape.

8. The apparatus of claim 1, wherein at least one of the first or the second OSF antenna is configured such that signals at higher frequencies are more squinted than signals at lower frequencies.

9. The apparatus of claim 1, comprising:

a continuous wave metal detector.

10. The apparatus of claim 9, wherein the continuous wave metal detector comprises:

a transmission coil around the antennas configured to transmit a set of signals; and a receive coil that overlaps the antennas configured to sense return signals in response to a transmission of the set of signals.

11. The apparatus of claim 10, wherein the processor is configured to detect the object based on the return signal sensed by the receive antenna and the return signals received by the receive coil of the continuous wave metal detector.

12. The apparatus of claim 1, wherein the object comprises a metallic object located beneath a ground surface.

13. A method comprising:

generating, by a transceiver, a radar signal;

emitting the radar signal towards an object using first offset spiral feed (OSF) antenna;

in response to emitting the radar signal towards the object, sensing a return signal using a second OSF antenna; and in response to sensing a return signal, detecting the object, wherein the first and second OSF antennas each comprise substantially spiral shaped feed arms with a central point of the feed arms being offset from a center axis of the OSF antenna that is substantially orthogonal to a plane of the OSF antenna, and wherein the first and the second OSF antennas are arranged such that the central point of the feed arms of the first OSF antenna is offset from the center axis of first OSF antenna in a direction away from the second OSF antenna.

14. The method of claim 13, wherein detecting the object comprises:

calibrating the return signal based on amounts of the offsets; and detecting the object based on the calibrated return signal.

15. The method of claim 13, wherein the feed arms of the first OSF antenna comprises a logarithmic spiral shape.

16. An antenna array comprising:

a first offset spiral feed (OSF) antenna that includes substantially spiral shaped feed arms with a central point of the feed arms being offset from a center axis of the first OSF antenna that is substantially orthogonal to a plane of the first OSF antenna;

a second OSF antenna that includes substantially spiral shaped feed arms with a central point of the feed arms being offset from a center axis of the second OSF antenna that is substantially orthogonal to a plane of the second OSF antenna, and wherein the first and the second OSF antennas are arranged such that the central point of the feed arms of the first OSF antenna is offset from the center axis of first OSF antenna in a direction away from the second OSF antenna.

17. The antenna array of claim 16, wherein the spiral shaped feed arms of at least one of the first or the second OSF antenna comprise a logarithmic spiral shape.

18. The antenna array of claim 16, wherein the spiral shaped feed arms of at least one of the first or the second OSF antenna comprise an Archimedean logarithmic spiral shape.

19. The antenna array of claim 16, wherein the spiral shaped feed arms of at least one of the first or the second OSF antenna comprise a spiral having a first portion with a logarithmic spiral shape and a second portion with an Archimedean spiral shape.

20. The antenna array of claim 16, further comprising a third OSF antenna that includes substantially spiral shaped feed arms with a central point of the feed arms being offset from a center axis of the third OSF antenna that is substantially orthogonal to a plane of the third OSF antenna, and wherein the first, second, and third OSF antennas are arranged such that the respective central points of the feed arms of each of the first, second, and third OSF antennas are offset in directions away from respective others of the first, second, and third OSF antennas.

* * * * *